US010051200B2

(12) United States Patent
Onomura et al.

(10) Patent No.: US 10,051,200 B2
(45) Date of Patent: Aug. 14, 2018

(54) IMAGING APPARATUS AND CONTROL METHOD THEREOF

(71) Applicant: Olympus Corporation, Shibuya-ku, Tokyo (JP)

(72) Inventors: Kenichi Onomura, Hino (JP); Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 120 days.

(21) Appl. No.: 14/881,984

(22) Filed: Oct. 13, 2015

(65) Prior Publication Data
US 2016/0037083 A1  Feb. 4, 2016

Related U.S. Application Data

(63) Continuation of application No. PCT/JP2014/061305, filed on Apr. 22, 2014.

(30) Foreign Application Priority Data

Apr. 22, 2013  (JP) .................................. 2013-089176

(51) Int. Cl.
H04N 5/262 (2006.01)
H04N 5/232 (2006.01)
(Continued)

(52) U.S. Cl.
CPC ......... H04N 5/2621 (2013.01); H04N 5/2351 (2013.01); H04N 5/2353 (2013.01);
(Continued)

(58) Field of Classification Search
CPC ............. H04N 5/2621; H04N 5/23212; H04N 5/2351; H04N 5/2353; H04N 5/23293; H04N 9/045
(Continued)

(56) References Cited

U.S. PATENT DOCUMENTS

2009/0109310 A1*  4/2009  Kobayashi ......... H04N 5/23212
                                                     348/302
2009/0237523 A1*  9/2009  Date .................. H04N 5/23293
                                                     348/222.1
(Continued)

FOREIGN PATENT DOCUMENTS

CN    102244731    11/2011
JP    01-241276    9/1989
(Continued)

OTHER PUBLICATIONS

Extended European Search Report to corresponding European Patent Application No. 14 788 507.3, dated Sep. 23, 2016 (9 pgs).
(Continued)

Primary Examiner — Nhan T Tran
(74) Attorney, Agent, or Firm — John C. Pokotylo; Pokotylo Patent Services

(57) ABSTRACT

An imaging apparatus includes an imaging unit, a peak image generating unit, a background image generating unit, a composing unit, and a display unit. The imaging unit images a subject to acquire RAW data. The peak image generating unit extracts peak portions from the RAW data to generate peak image data. The background image generating unit subjects the RAW data to image processing to generate background image data. The composing unit composes the peak image data with the background image data to generate composite image data. The display unit displays an image based on the composite image data.

8 Claims, 16 Drawing Sheets

(51) Int. Cl.
*H04N 5/235* (2006.01)
*H04N 9/04* (2006.01)
*H04N 101/00* (2006.01)

(52) U.S. Cl.
CPC ......... *H04N 5/23212* (2013.01); *H04N 9/045* (2013.01); *H04N 5/23293* (2013.01); *H04N 2101/00* (2013.01)

(58) Field of Classification Search
USPC .................................................. 348/239, 345
See application file for complete search history.

(56) References Cited

U.S. PATENT DOCUMENTS

| | | | | |
|---|---|---|---|---|
| 2010/0259652 A1* | 10/2010 | Miura | H04N 5/23212 348/252 |
| 2011/0128432 A1* | 6/2011 | Shiohara | H04N 5/23212 348/333.02 |
| 2011/0273610 A1* | 11/2011 | Tay | H04N 5/23212 348/345 |
| 2012/0287308 A1* | 11/2012 | Kojima | H04N 5/23293 348/239 |
| 2013/0194475 A1* | 8/2013 | Okamoto | H04N 5/23212 348/333.01 |
| 2014/0211050 A1* | 7/2014 | Nakamaru | H04N 5/23212 348/252 |

FOREIGN PATENT DOCUMENTS

| | | |
|---|---|---|
| JP | 2002-247422 | 8/2002 |
| JP | 2010-050592 | 3/2010 |
| JP | 2012-160942 | 8/2012 |
| JP | 2012-231362 | 11/2012 |

OTHER PUBLICATIONS

First Office Action to corresponding Japanese Patent Application No. 2013-089176, dated Oct. 4, 2016 (3 pgs.) with translation (4 pgs.).

International Search Report to International Application No. PCT/JP2014/061305, dated Jun. 10, 2014 (3 pgs.) with translation (2 pgs.).

Written Opinion of the International Searching Authority to International Application No. PCT/JP2014/061305, dated Jun. 10, 2014 (4 pgs.).

Translated Written Opinion of the International Searching Authority to International Application No. PCT/JP2014/061305, dated Jun. 10, 2014, (6 pgs.).

First Office Action to corresponding Chinese Patent Application No. 201480022679.2, dated Sep. 25, 2017 (8 pgs.), with translation (15 pgs.).

* cited by examiner

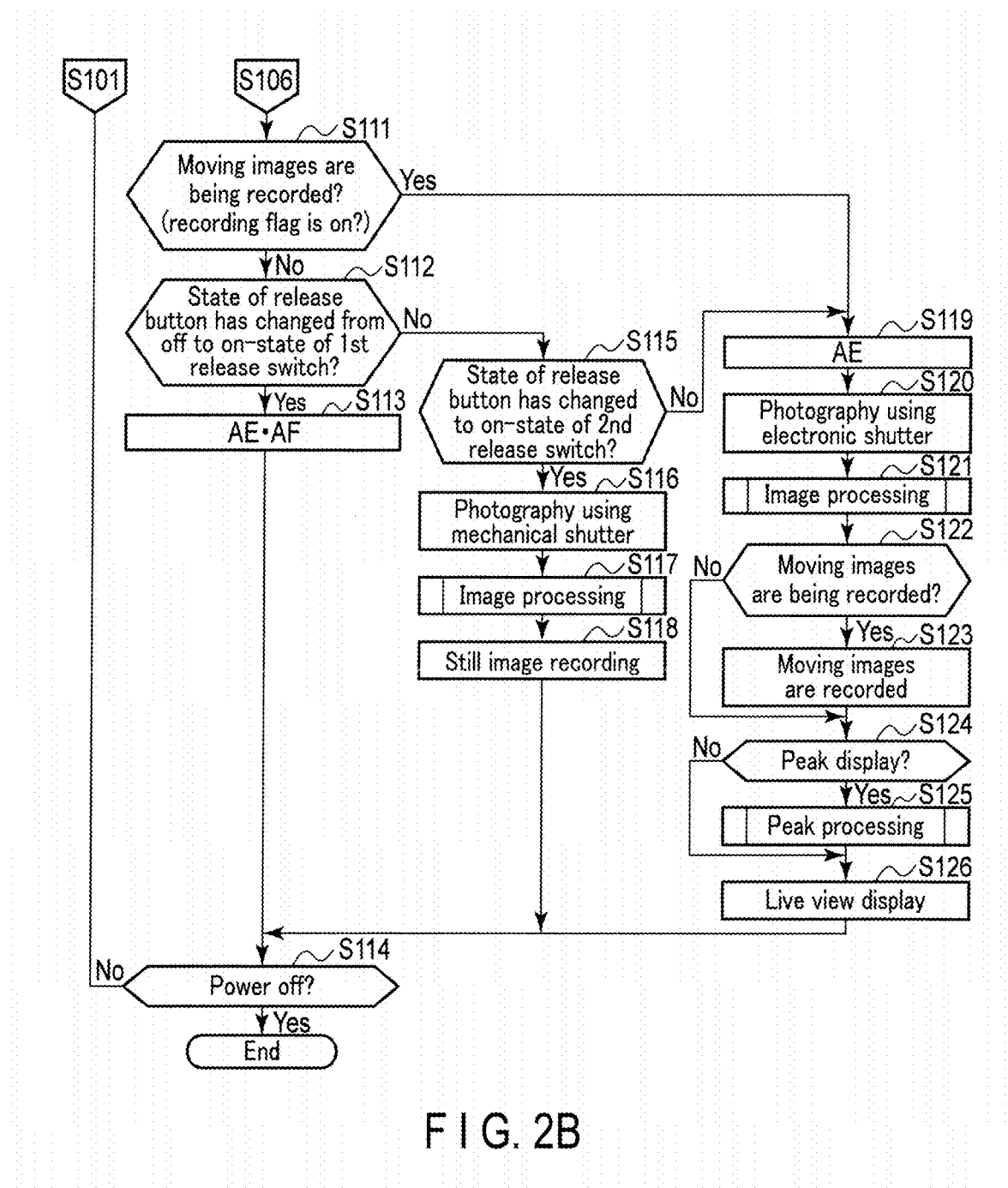
F I G. 2B

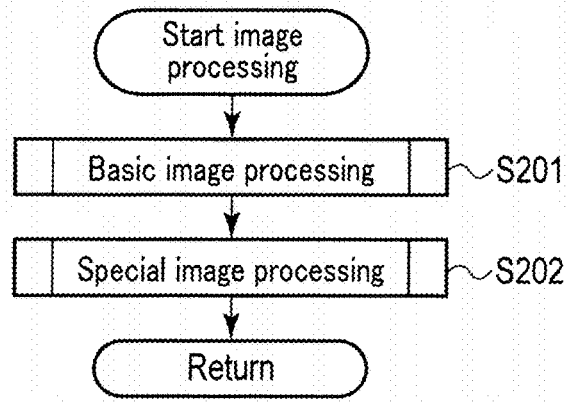
F I G. 3
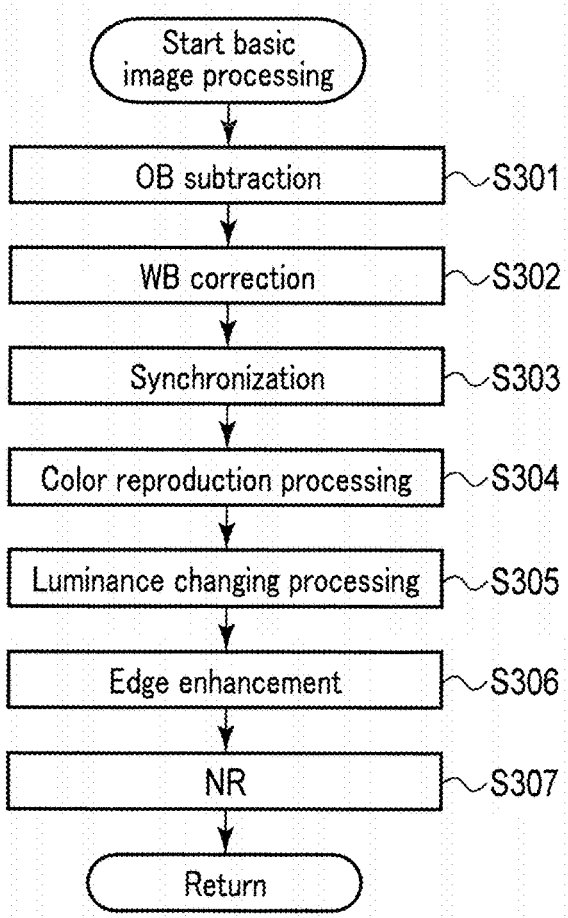
F I G. 4

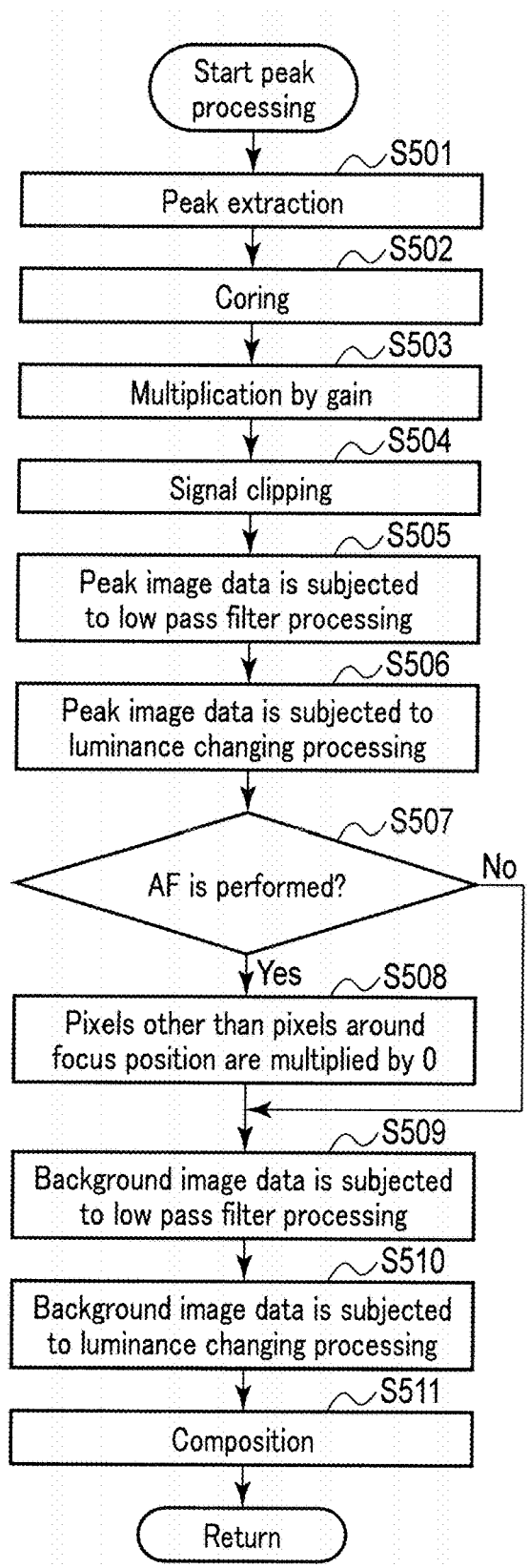
F I G. 7

| 100 | 240 | 600 | 240 | 100 |
|---|---|---|---|---|
| 240 | 576 | 1440 | 576 | 240 |
| 600 | 1440 | 3600 | 1440 | 600 |
| 240 | 576 | 1440 | 576 | 240 |
| 100 | 240 | 600 | 240 | 100 |
F I G. 9
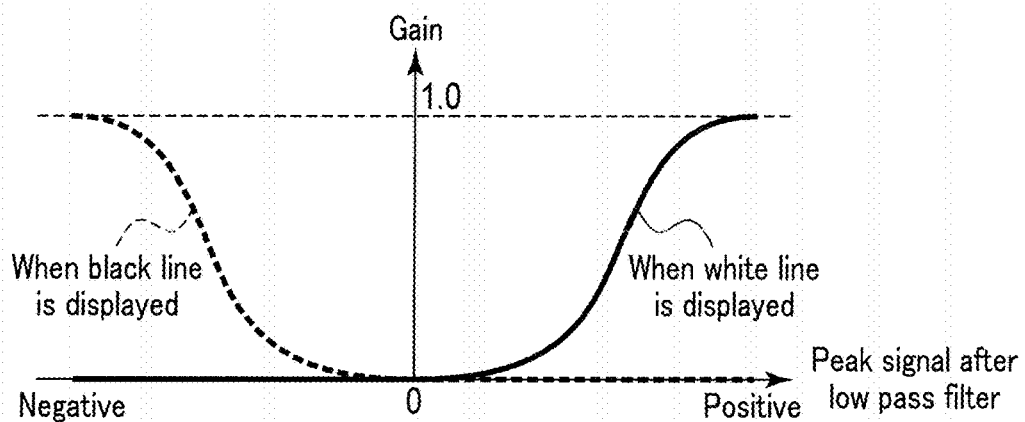
F I G. 10
| 576 | 576 | 768 | 576 | 576 |
|---|---|---|---|---|
| 576 | 576 | 768 | 576 | 576 |
| 768 | 768 | 1024 | 768 | 768 |
| 576 | 576 | 768 | 576 | 576 |
| 576 | 576 | 768 | 576 | 576 |
F I G. 11

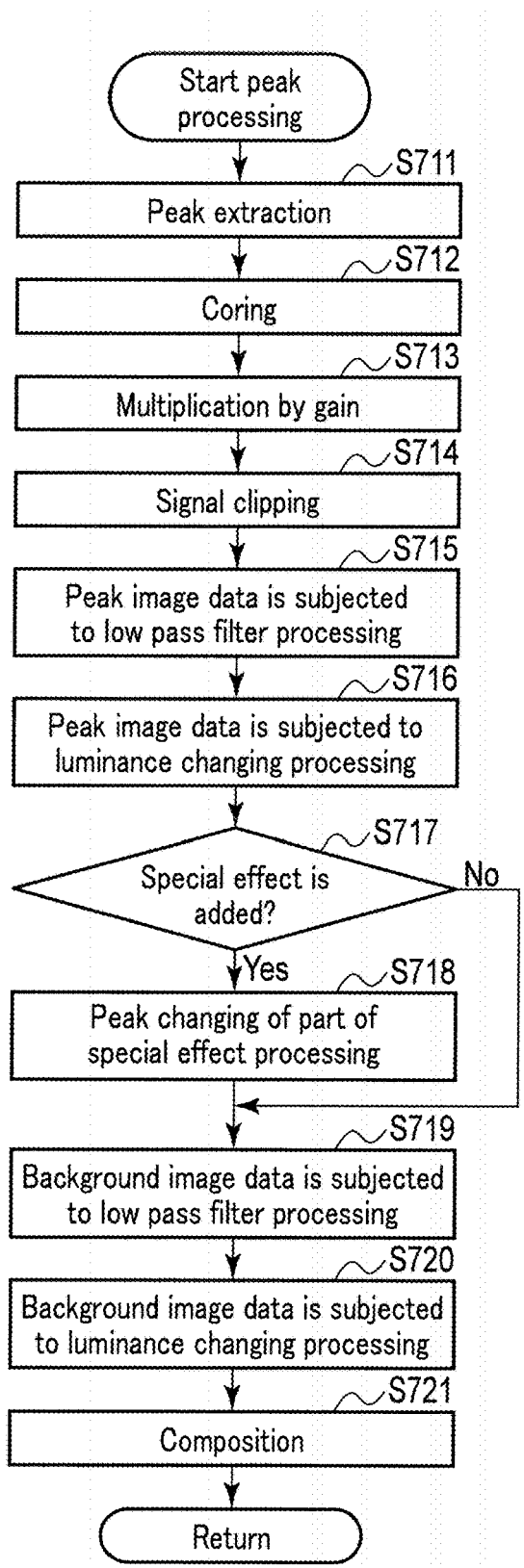
F I G. 14

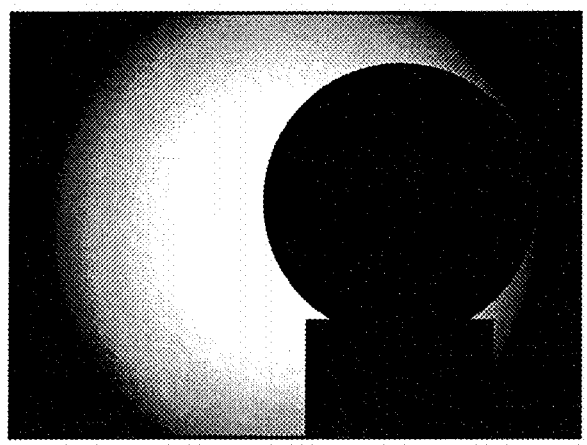
F I G. 15A
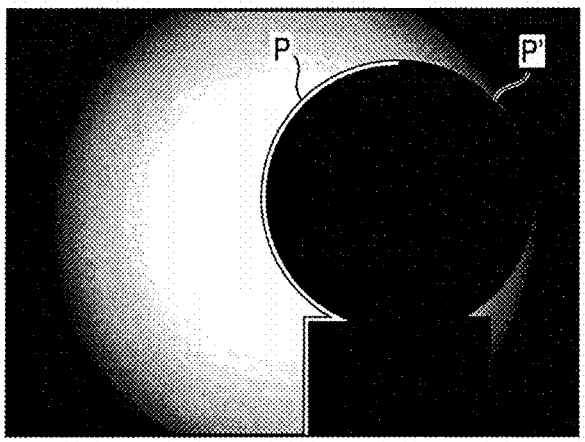
F I G. 15B

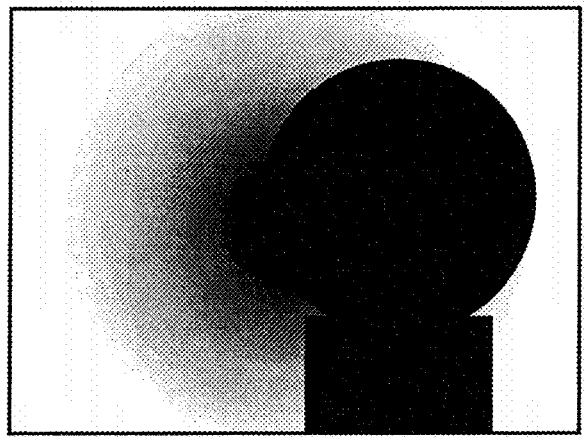
F I G. 17A
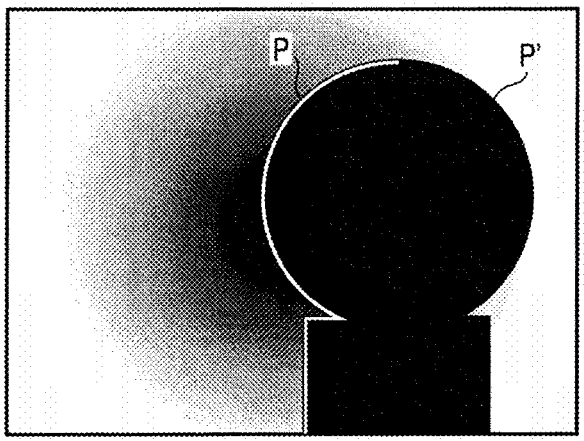
F I G. 17B

IMAGING APPARATUS AND CONTROL METHOD THEREOF

CROSS-REFERENCE TO RELATED APPLICATIONS

This application is a Continuation Application of PCT Application No. PCT/JP2014/061305, filed Apr. 22, 2014 and based upon and claiming the benefit of priority from the prior Japanese Patent Application No. 2013-089176, filed Apr. 22, 2013, the entire contents of both of which are incorporated herein by reference.

BACKGROUND OF THE INVENTION

1. Field of the Invention

The present invention relates to an imaging apparatus having a peaking display mode and a control method thereof.

2. Description of the Related Art

Heretofore, as a technique for easily checking the focus state of a subject on an image, there has been known so-called peaking display in which a peak portion of contrast to be a candidate for a focus position in the image is highlighted. When the peak portion is merely highlighted, a peak portion of an in-focus subject may not be distinguished from a peak portion of an out-of-focus subject in a display unit having a small dynamic range. Thus, in Jpn. Pat. Appln. KOKAI Publication No. 2010-050592, a peak portion is highlighted after the amplitude of an image signal is reduced.

BRIEF SUMMARY OF THE INVENTION

An imaging apparatus according to a first aspect of the invention comprises: an imaging unit which images a subject to acquire RAW data; a peak image generating unit which extracts peak portions from the RAW data to generate peak image data; a background image generating unit which subjects the RAW data to image processing to generate background image data; a composing unit which composes the peak image data with the background image data to generate composite image data; and a display unit which displays an image based on the composite image data.

A control method of an imaging apparatus according to a second aspect of the invention, the imaging apparatus comprising an imaging unit which images a subject to acquire RAW data, and a display unit which displays an image based on image data generated on the basis of the RAW data, the control method comprises: extracting peak portions from the RAW data to generate peak image data; subjecting the RAW data to image processing to generate background image data; composing the peak image data with the background image data to generate composite image data; and displaying an image based on the composite image data.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2B is a second diagram of the flowchart showing the main operation of the digital camera;

FIG. 3 is a flowchart showing image processing;

FIG. 4 is a flowchart showing basic image processing;

FIG. 7 is a flowchart showing peak processing according to the first embodiment;

FIG. 9 is a table showing an example of the filter factors of a low pass filter used in low pass filter processing for peak image data;

FIG. 10 is a graph showing an example of luminance change characteristic curves used in luminance changing processing for the peak image data;

FIG. 11 is a table showing an example of the filter factors of a low pass filter used in low pass filter processing for background image data;

FIG. 14 is a flowchart showing peak processing according to the third embodiment;

FIG. 15A is a first diagram illustrating peak changing processing in the case where a shading effect is added to the background image data;

FIG. 15B is a second diagram illustrating the peak changing processing in the case where the shading effect is added to the background image data;

FIG. 17A is a first diagram illustrating peak changing processing in the case where the background image data is subjected to white edge processing;

FIG. 17B is a second diagram illustrating the peak changing processing in the case where the background image data is subjected to the white edge processing;

DETAILED DESCRIPTION OF THE INVENTION

Hereinafter, embodiments of the present invention will be described with reference to the drawings.

First Embodiment

Figure 1:
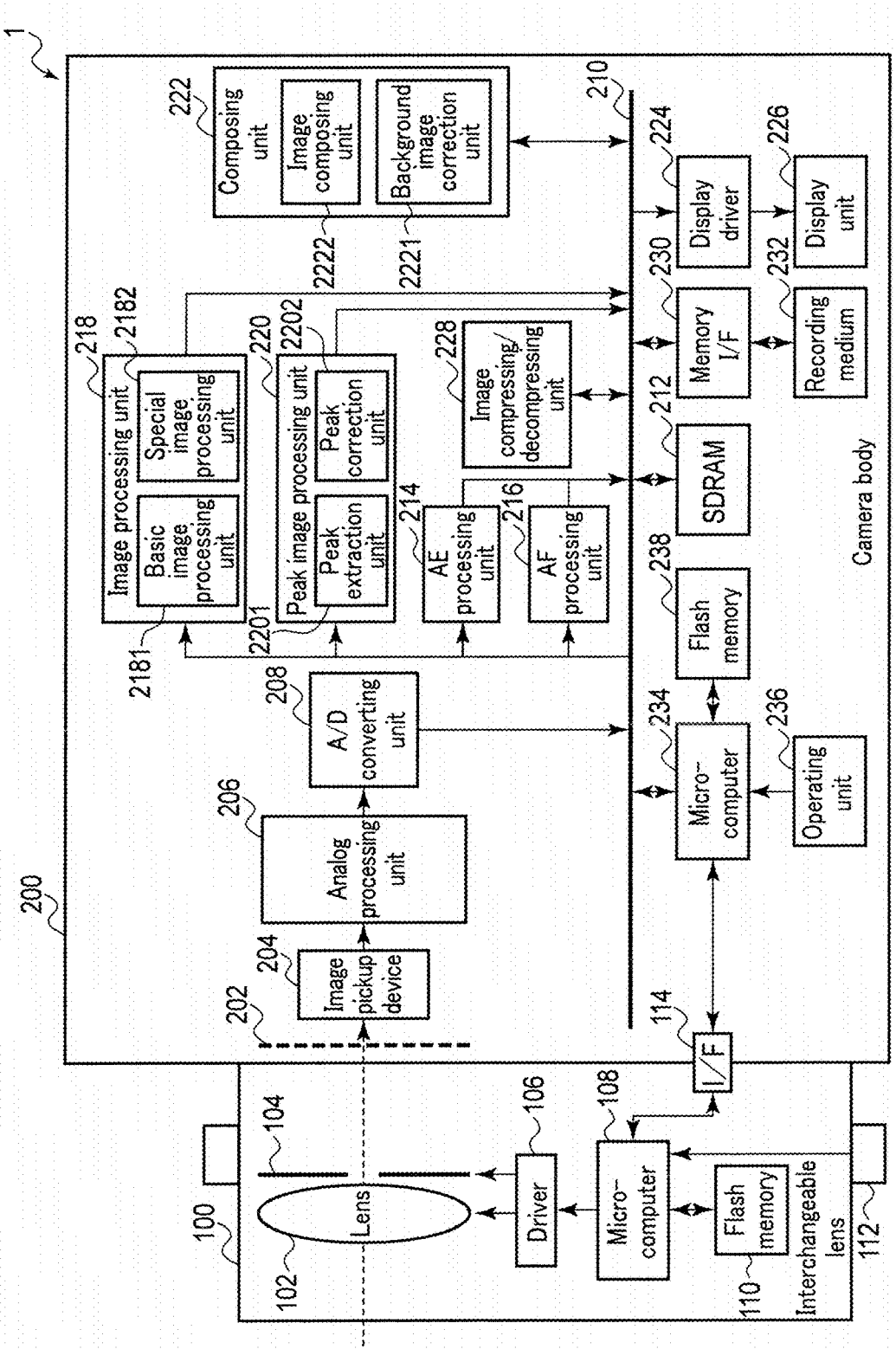
FIG. 1 is a block diagram showing the configuration of a digital camera as an example of an imaging apparatus according to each embodiment of the present invention.

FIG. 1 is a block diagram showing the configuration of a digital camera as an example of an imaging apparatus according to each embodiment of the present invention. A digital camera 1 shown in FIG. 1 is a lens-interchangeable digital camera. However, the digital camera 1 does not necessarily have to be the lens-interchangeable digital camera, and may be a digital camera including an integral lens. The technique according to the present embodiment is also applicable to, for example, a mobile telephone having an imaging function or a portable terminal having an imaging function.

The digital camera 1 shown in FIG. 1 includes an interchangeable lens 100 and a camera body 200. The interchangeable lens 100 is configured to be removable from the camera body 200. When the interchangeable lens 100 is attached to the camera body 200, the interchangeable lens 100 is connected to the camera body 200 in communication with each other. As a result, the interchangeable lens 100 is operable under the control of the camera body 200.

The interchangeable lens 100 includes a lens 102, a diaphragm 104, a driver 106, a microcomputer 108, a flash memory 110, and a focus ring 112.

The lens 102 is an optical system for collecting a light flux from an unshown subject to an image pickup device 204 in the camera body 200. The lens 102 includes lenses such as a focus lens and a zoom lens.

The diaphragm 104 is configured to open and close, and adjusts the amount of the light flux which has entered via the lens 102. The driver 106 includes a motor and others. Under the control of the microcomputer 108, the driver 106 drives the focus lens and the zoom lens in the lens 102 in its optical axis direction, and drives the diaphragm 104 to open and close.

The microcomputer 108 is connected to a microcomputer 234 in the camera body 200 via an interface (I/F) 114 in communication with each other when the interchangeable lens 100 is connected to the camera body 200. This microcomputer 108 drives the driver 106 under the control of the microcomputer 234. The microcomputer 108 communicates lens information regarding the interchangeable lens 100 stored in the flash memory 110 to the microcomputer 234 via the I/F 114.

Lens information such as aberration information regarding the lens 102, and programs necessary to execute the operation of the interchangeable lens 100 are stored in the flash memory 110.

The focus ring 112 is an operational member for a user to manually operate the focus lens. The focus ring 112 is formed in the main body of the interchangeable lens 100 to be rotationally operated. The focus ring 112 is rotated by the user and thereby inputs a signal regarding a rotation amount to the microcomputer 234.

The camera body 200 includes a mechanical shutter 202, the image pickup device 204, an analog processing unit 206, an analog/digital (AD) converting unit 208, a bus 210, an SDRAM 212, an AE processing unit 214, an AF processing unit 216, an image processing unit 218, a peak image processing unit 220, a composing unit 222, a display driver 224, a display unit 226, an image compressing/decompressing unit 228, a memory interface (I/F) 230, a recording medium 232, the microcomputer 234, an operating unit 236, and a flash memory 238.

The mechanical shutter 202 is configured to move a photoelectric conversion surface of the image pickup device 204 into a shaded state or an exposed state. The exposure time of the image pickup device 204 is adjusted by the movement of the mechanical shutter 202.

The image pickup device 204 includes the photoelectric conversion surface on which the light flux from the subject collected via the lens 102 is formed into an image. The photoelectric conversion surface is configured by two-dimensionally arrayed pixels. A color filter is provided on the light entrance side of the photoelectric conversion surface. This image pickup device 204 converts an image (subject image) corresponding to the light flux formed on the photoelectric conversion surface into an electric signal (hereinafter referred to as an image signal) corresponding to the light amount, and then outputs the electric signal.

Here, image pickup devices having various configurations of, for example, a CCD type and CMOS type are known as the image pickup device 204. Various arrangements such as a Bayer arrangement are known as color arrangements of the color filter. The image pickup device 204 may be a type of sensor in which sensors for acquiring color information are stacked, or may be a sensor which does not have the above-mentioned color filter. In the present embodiment, the configuration of the image pickup device 204 is not limited to a particular configuration, and image pickup devices having various configurations can be used.

The image pickup device 204 may have an electronic shutter function to electronically control the exposure time. In the following explanation, the image pickup device 204 has the electronic shutter function.

The analog processing unit 206 subjects the image signal obtained by the image pickup device 204 to analog processing such as correlated double sampling (CDS) processing and automatic gain control (AGC) processing. The AD converting unit 208 converts the image signal analog-processed in the analog processing unit 206 into a digital signal (hereinafter referred to as RAW data). Here, the RAW data is "raw" image data before being subjected to image processing in the image processing unit 218.

Here, the analog processing unit 206 and the AD converting unit 208 may be mounted on the image pickup device 204.

The image pickup device 204, the analog processing unit 206, and the AD converting unit 208 described above function as an imaging unit.

The bus 210 is a transfer path for transferring various data generated inside the camera body 200.

The SDRAM 212 is a storage unit for temporarily storing various data generated inside the camera body 200. This SDRAM 212 is also used as a buffer memory for image processing in the image processing unit 218 and the peak image processing unit 220.

The AE processing unit 214 calculates subject luminance by using image data (e.g., the RAW data). Here, the AE processing unit 214 may calculate subject luminance by using data from an exclusive sensor such as a photometric sensor. The AF processing unit 216 extracts signals of a high-frequency component from the image data (e.g., the RAW data), and adds up the extracted signals of the high-frequency component to acquire an AF evaluation value. Although AF by so-called contrast AF is used here in the present embodiment, AF by so-called phase difference AF that uses an exclusive sensor may be used.

The image processing unit 218 performs various kinds of image processing for the RAW data to generate image data. Here, the image processing performed in the image processing unit 218 is image processing such that the finish of the image data will be predetermined finish. The finish here refers to, for example, an appearance and a style during display. The image processing unit 218 also has a function as a background image generating unit. In a peaking display mode which will be described later in detail, image data generated by the image processing unit 218 is composed with peak image data. Hereinafter, in the peaking display mode, the image data generated by the image processing unit 218 will be referred to as background image data. However, the image data and the background image data that are generated in modes other than the peaking display mode are not different from each other in terms of data.

The image processing unit 218 in the present embodiment includes a basic image processing unit 2181 and a special image processing unit 2182.

The basic image processing unit 2181 subjects the image data to basic image processing necessary to display or record images. This basic image processing includes, for example, optical black (OB) subtraction processing, white balance (WB) correction processing, synchronization processing, color reproduction processing, luminance changing processing, edge enhancement processing, and noise reduction processing. The optical black subtraction processing is processing for subtracting and removing a dark current component (optical black) of the RAW data. The white balance correction processing is processing for amplifying each color component of the RAW data in a predetermined gain amount to correct the color balance of the image. The synchronization processing is processing for converting image data in which one pixel corresponds to one color component, such as the raw data output via the image pickup device 204 in accordance with an arrangement pattern of the color filter such as the Bayer arrangement, into RGB data in which one pixel corresponds to more than one color component. The color reproduction processing includes various kinds of processing such that the color reproduction of an image will be proper color reproduction. This processing is, for example, color matrix calculation processing. This color matrix calculation processing is processing for multiplying the RGB data by, for example, a color matrix coefficient corresponding to a white balance mode. In addition, the corrections of saturation and hue are also made as the color reproduction processing. The luminance changing processing is processing for converting the RGB data into YCbCr (luminance and color difference) data, and changing the luminance characteristics of Y data so that the luminance characteristics will be suitable for display and recording. The luminance characteristics of the RGB data may be changed as the luminance changing processing. The edge enhancement processing is processing for multiplying, by an edge enhancement coefficient, an edge signal extracted from the image data (the RGB data or the YCbCr data) by use of, for example, a band pass filter, and adding the result to the original image data to enhance an edge (contour) component in the image data. The noise reduction processing is processing for removing a noise component in the image data (the RGB data or the YCbCr data) by, for example, coring processing.

The special image processing unit 2182 subjects the image data (the RGB data or the YCbCr data) to special image processing to provide a special visual effect. This special image processing will be described later in detail.

The peak image processing unit 220 as a peak image generating unit generates peak image data from the image data (the RAW data) during the peaking display mode. The peak image data is obtained by extracting a peak portion of contrast which is a candidate for a focus position in the image data.

The peak image processing unit 220 includes a peak extraction unit 2201 and a peak correction unit 2202. The peak extraction unit 2201 extracts a peak signal from the image data (e.g., the RAW data) by using the band pass filter. When the peak signal is extracted by the use of the band pass filter, the extracted peak signal is mainly the signal of an edge portion. Here, as described above, the edge signal is extracted in the edge enhancement processing in the basic image processing unit 2181 as well. Therefore, the peak extraction unit 2201 can be replaced by a circuit (edge enhancement processing unit) provided in the basic image processing unit 2181 to perform the edge enhancement processing. The peak correction unit 2202 changes the luminance characteristics of the peak signal extracted by the peak extraction unit 2201. As described above, the luminance characteristics are also changed in the luminance changing processing in the basic image processing unit 2181. Therefore, the peak correction unit 2202 can be replaced by a circuit (luminance changing processing unit) provided in the basic image processing unit 2181 to perform the luminance changing processing.

The composing unit 222 composes the background image data obtained by the image processing unit 218 with the peak image data obtained by the peak image processing unit 220 to generate composite image data during the peaking display. The composing unit 222 includes a background image correction unit 2221 and an image composing unit 2222. The background image correction unit 2221 performs image processing to correct the background image data to emphasize a portion of the peak image data to be composed with the background image data. This image processing includes, for example, low pass filter processing, the luminance changing processing, and saturation changing processing. The background image correction unit 2221 selects proper correction processing in accordance with the content of the image processing which has been provided to the background image data. The image composing unit 2222 composes the background image data with the peak image data to generate composite image data.

The display driver 224 resizes, in accordance with the display size of the display unit 226, the background image data obtained in the image processing unit 218 or image data obtained by decompression in the image compressing/decompressing unit 228 or the composite image data obtained in the composing unit, and converts the resized image data into a video signal, and then outputs the video signal to the display unit 226. The display unit 226 is, for example, a liquid crystal display (LCD). The display unit 226 displays an image based on the video signal input from the display driver 224.

In the recording of the image, the image compressing/decompressing unit 228 subjects the image data obtained by the image processing in the image processing unit 218 to still image compressing processing in a JPEG format or TIFF format or moving image compressing processing in an MPEG format or an H.264 format. The image compressing/decompressing unit 228 decompresses the compressed image data during the reproduction of the image.

The memory I/F 230 is an interface for the microcomputer 234 and others to access the recording medium 232. The recording medium 232 is, for example, a memory card removable from the camera body 200. Image files, for example, are recorded in the recording medium 232. The image file is a file in which header information is added to the image data compressed by the image compressing/decompressing unit 228. The recording medium 232 may be fixed to the camera body 200 (may be unremovable).

The microcomputer 234 has overall control of the operation of each of the components of the camera body 200 including the mechanical shutter 202, the image pickup device 204, and the display driver 224. The microcomputer 234 also performs AE processing using the subject luminance calculated in the AE processing unit 214, and AF processing using the AF evaluation value calculated in the AF processing unit 216. The microcomputer 234 also has a function as a focus position acquiring unit, and acquires a focus position in the image data by evaluating the AF evaluation value. Moreover, the microcomputer 234 also controls the operation of the interchangeable lens 100 when the interchangeable lens 100 is attached.

The operating unit 236 includes various operational components to be operated by the user. For example, the operating unit 236 in the present embodiment includes, as the operational components, a release button, a moving image button, a menu button, a reproduction button, a peaking display switch button, and a power button.

The release button includes a two-step switch for a first (1st) release switch and a second (2nd) release switch. When the release button is pressed halfway and the first release switch is turned on accordingly, the microcomputer 234 performs photographic preparation processing such as AE processing and AF processing. When the release button is fully pressed and the second release switch is turned on accordingly, the microcomputer 234 performs still image recording processing.

The moving image button instructs the microcomputer 234 to perform moving image photography. When the moving image button is pressed, the microcomputer 234 performs moving image recording processing. When the moving image button is pressed during the execution of the moving image recording processing, the microcomputer 234 finishes the moving image recording processing.

The menu button is an operation unit for instructing to display a menu screen. On the menu screen, the user can change various settings of the camera body 200. In the present embodiment, the user sets, for example, a special image processing mode on the menu screen. In accordance with this special image processing mode, the contents of the special image processing provided in the special image processing unit 2182 are set.

The reproduction button is an operation unit for instructing the microcomputer 234 to reproduce a still image file or a moving image file. The power button is an operation unit for instructing to turn on or off the camera body 200.

The peaking display switch button is an operation unit for instructing to switch on and off the peaking display mode. This peaking display switch button functions as an example of a peaking display instruction unit.

Here, functions equivalent to those of the release button, the moving image button, the menu button, the reproduction button, and the peaking display switch button described above may be provided by a touch panel. That is, there may be no physical operational components such as the buttons.

Various parameters necessary for the operation of the camera body 200 are stored in the flash memory 238, such as parameters necessary for the operation of the image processing unit 218: a white balance gain for a white balance correction, the color matrix coefficient for a color matrix calculation, and various functions for luminance characteristic change. Various programs to be executed by the microcomputer 234 are also stored in the flash memory 238.

Figure 2A:
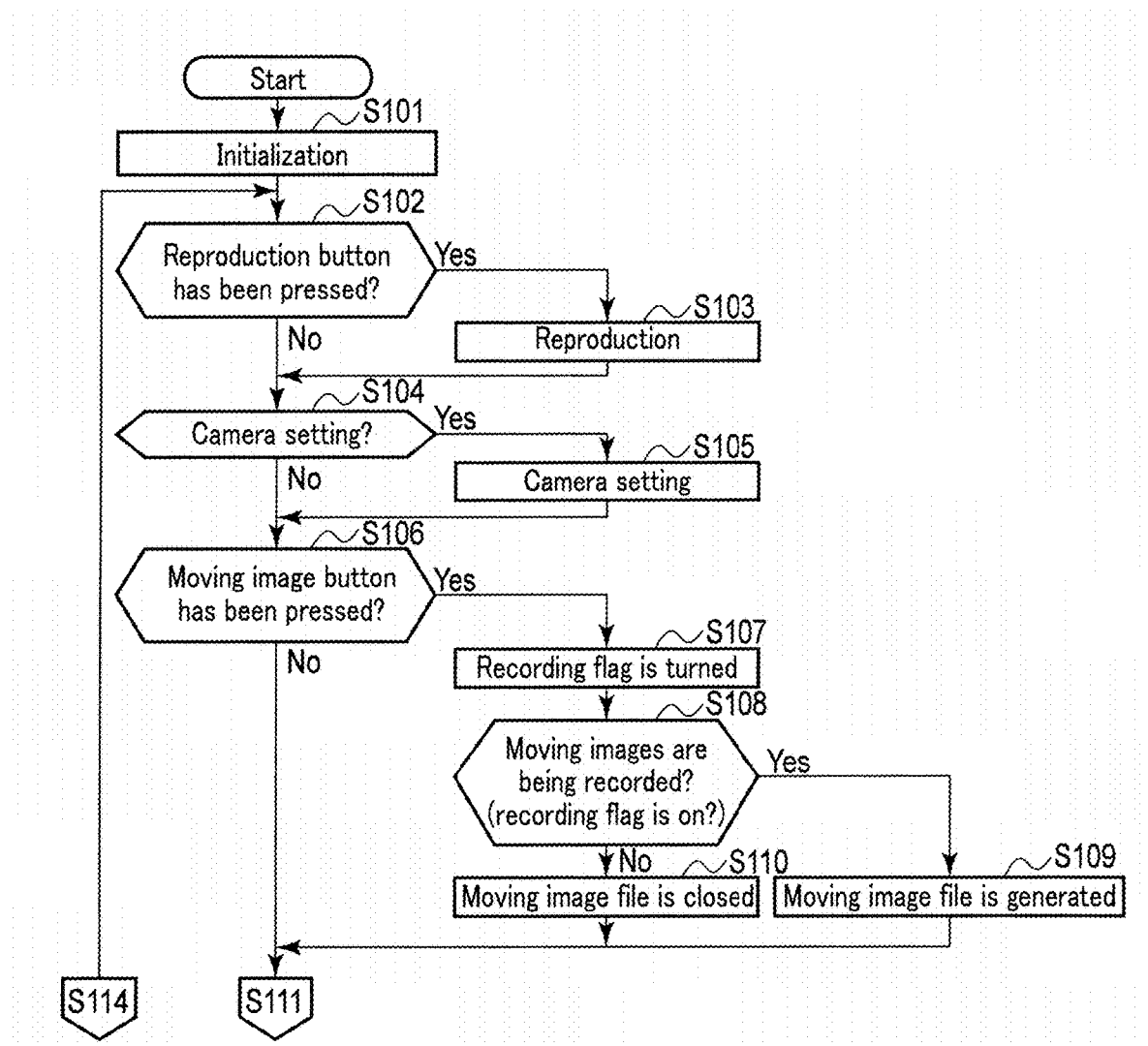
FIG. 2A is a first diagram of a flowchart showing the main operation of the digital camera.

The operation of the above digital camera is described below. FIG. 2A and FIG. 2B are flowcharts showing the main operation of the digital camera according to the present embodiment. The operation in FIG. 2A and FIG. 2B is performed, for example, when the power of the digital camera 1 shown in FIG. 1 is turned on.

After the power is turned on, the microcomputer 234 performs initialization processing (step S101). In the initialization processing, the microcomputer 234 performs processing to turn off a recording flag set in its register. The recording flag is a flag that indicates whether moving images are being recorded. The recording flag that is turned off indicates that moving images are not being recorded. On the other hand, the recording flag that is turned on indicates that moving images are being recorded.

The microcomputer 234 then determines whether the reproduction button of the operating unit 236 has been pressed by the user (step S102). When it is determined in step S102 that the reproduction button has been pressed, the microcomputer 234 performs reproduction processing (step S103).

In the reproduction processing, the microcomputer 234 waits for the user to select an image file (the still image file or the moving image file). When an image file is selected, the microcomputer 234 decodes the selected image file by the image compressing/decompressing unit 228. The microcomputer 234 inputs the image data obtained by the decoding to the display driver 224. The display driver 224 converts the input image data into a video signal, and displays an image corresponding to this video signal on the display unit 226. When the user then instructs to finish the reproduction, for example, when the reproduction button is pressed again, the microcomputer 234 finishes the reproduction processing.

When it is determined in step S102 that the reproduction button has been pressed, the microcomputer 234 determines whether to perform camera setting (step S104). For example, when the menu button of the operating unit 236 is pressed by the user, the microcomputer 234 determines to perform the camera setting.

When it is determined in step S104 to perform the camera setting, the microcomputer 234 controls the display driver 224 to cause the display unit 226 to display the menu screen, and then performs camera setting processing (step S105).

In the camera setting processing, the microcomputer 234 waits for an instruction from the user to change the camera setting. When instructed to make some change in the camera setting, the microcomputer 234 changes the camera setting accordingly. In this camera setting processing, changes are made in, for example, the setting of the recording format of the image during still image photography or moving image photography, and the settings regarding the finish of the image in, for example, the white balance (WB) mode. In the camera setting processing, it is also possible to set whether to perform the special image processing, and set the special image processing mode for performing the special image processing.

When it is determined in step S104 not to perform the camera setting, the microcomputer 234 determines whether the moving image button of the operating unit 236 has been pressed by the user (step S106). When it is determined in step S106 that the moving image button has been pressed, the microcomputer 234 turns the recording flag (step S107). That is, the microcomputer 234 turns on the recording flag that is off, and turns off the recording flag that is on. The microcomputer 234 then determines whether moving images are being recorded at present, that is, whether the recording flag is on (step S108).

When it is determined in step S108 that the recording flag is on, the microcomputer 234 creates a moving image file, and prepares for the moving image data to be recorded (step S109). When it is determined in step S108 that the recording flag is not on, the microcomputer 234 closes the moving image file (step S110).

When it is determined in step S106 that the moving image button has not been pressed, the microcomputer 234 closes the moving image file in step S110 after the creation of the moving image file in step S109, and then again determines whether moving images are being recorded at present, that is, whether the recording flag is on (step S111).

When it is determined in step S111 that the recording flag is off, the microcomputer 234 determines whether the release button of the operating unit 236 has been pressed halfway by the user so that the state of the release button has changed from the off-state to the on-state of the 1st release switch (step S112).

When it is determined in step S112 that the state of the release button has changed to the on-state of the 1st release switch, the microcomputer 234 performs the AE processing and the AF processing (step S113).

In the AE processing, the microcomputer 234 causes the AE processing unit 214 to calculate subject luminance. The microcomputer 234 then decides the ISO, an F-value (aperture value), and a shutter speed during still image photography in accordance with the subject luminance calculated by the AE processing unit 214. Here, when, for example, a known face detection technique is used, the ISO, the F-value, and the shutter speed may be decided so that the luminance of a detected face will be proper.

In the AF processing, the microcomputer 234 causes the AF processing unit 216 to acquire an AF evaluation value. The microcomputer 234 then evaluates contrast by the AF evaluation value acquired by the AF processing unit 216, and at the same time instructs the microcomputer 108 to drive the focus lens of the lens 102 in slight amounts. The microcomputer 234 then instructs the microcomputer 108 to stop the driving of the focus lens at the point where the contrast is maximized. This AF processing is what is known as contrast-type AF processing. Phase difference AF processing may be used as the AF processing. Here, when, for example, a known face detection technique is used, the detected face may be brought into focus.

After the AE processing and the AF processing, the microcomputer 234 determines whether the power of the digital camera 1 has been turned off (step S114). When it is determined in step S114 that the power of the digital camera 1 has not been turned off, the microcomputer 234 performs processing in and after step S102. On the other hand, when it is determined in step S114 that the power of the digital camera has been turned off, the microcomputer 234 finishes the processing in FIG. 2A and FIG. 2B.

When it is determined in step S112 that the state of the release button has not changed to the on-state of the 1st release switch, the microcomputer 234 determines whether the release button of the operating unit 236 has been fully pressed by the user so that the state of the release button has changed to the on-state of the 2nd release switch (step S115).

When it is determined in step S115 that the state of the release button is the on-state of the 2nd release switch, the microcomputer 234 performs photography processing using the mechanical shutter 202 (step S116). Accordingly, the microcomputer 234 sets a gain control amount (amplification factor) in the analog processing unit 206 in accordance with the ISO decided in the AE processing, and sends an F-value decided in the AE processing to the microcomputer 108. The microcomputer 234 then actuates the mechanical shutter 202 in accordance with the exposure time decided in the AE processing to control the exposure value of the image pickup device 204 synchronously with the driving of the diaphragm 104 controlled by the microcomputer 108. The RAW data is stored in the SDRAM 212 by this photography processing.

After having performed the photography processing using the mechanical shutter 202, the microcomputer 234 causes the image processing unit 218 to perform image processing for the RAW data which has been stored in the SDRAM 212 by the photography processing (step S117). The image processing will be described in detail later.

After the image processing, the microcomputer 234 performs processing to record the image data stored as the result of the image processing in the SDRAM 212, as a still image file in a set still image recording format (step S118). At the same time, the microcomputer 234 inputs the image data stored in the SDRAM 212 to the image compressing/decompressing unit 228 to instruct the image compressing/decompressing unit 228 to perform still image compressing processing. In response to this instruction, the image compressing/decompressing unit 228 performs the still image compressing processing in accordance with the preset recording mode, and stores the compressed image data in the SDRAM 212. The microcomputer 234 then reads the image data compressed by the image compressing/decompressing unit 228 from the SDRAM 212, creates a still image file from the read image data, and records the created still image file in the recording medium 232.

When it is determined in step S115 that the state of the release button is not the on-state of the 2nd release switch, the microcomputer 234 performs the AE processing (step S119). This AE processing is processing for moving image photography or live view display. After the AE processing, the microcomputer 234 performs photography processing using the electronic shutter (step S120). In this photography processing, the microcomputer 234 actuates the electronic shutter function of the image pickup device 204 in accordance with the exposure time decided in the AE processing to control the exposure value of the image pickup device 204. The RAW data is stored in the SDRAM 212 by this photography processing.

After having performed the photography processing using the electronic shutter, the microcomputer 234 causes the image processing unit 218 to perform image processing for the RAW data which has been stored in the SDRAM 212 by the photography processing (step S121). The image processing will be described in detail later.

After the image processing, the microcomputer 234 determines whether moving images are being recorded at present, that is, whether the recording flag is on (step S122). When it is determined in step S122 that the recording flag is on, the microcomputer 234 skips the processing in step S123.

When it is determined in step S122 that the recording flag is on, the microcomputer 234 performs processing to record the image data stored as the result of the image processing in the SDRAM 212, as a moving image file in a set moving image recording format (step S123). At the same time, the microcomputer 234 inputs the moving image data stored in the SDRAM 212 to the image compressing/decompressing unit 228 to instruct the image compressing/decompressing unit 228 to perform moving image compressing processing. In response to this instruction, the image compressing/ decompressing unit 228 performs the moving image compressing processing in accordance with the preset recording mode, and stores the compressed moving image data in the SDRAM 212. The microcomputer 234 then reads the moving image data compressed by the image compressing/decompressing unit 228 from the SDRAM 212, and additionally records the read moving image data in the previously created moving image file. When the recording of the moving image data has been finished, information such as the number of frames is recorded in a header recording portion of the moving image file. In peak processing described in detail later, the peak image data and the background image data are subjected to image processing, and the result is displayed. It is not necessary to record the peak image data and the background image data together with the moving image file.

When it is determined in step S122 that the recording flag is off or after step S123, the microcomputer 234 determines whether an instruction for peaking display has been issued (step S124). For example, the peaking display is switched on and off whenever the peaking display switch button as an example of the peaking display instruction unit is pressed. Otherwise, it may be determined that the instruction for peaking display has been issued when the focus ring 112 as another example of the peaking display instruction unit is operated. When it is determined in step S124 that the instruction for peaking display has not been issued, the microcomputer 234 skips the processing in step S125.

When it is determined in step S124 that the instruction for peaking display has been issued, the microcomputer 234 performs the peak processing (step S125). The peak processing will be described in detail later.

When it is determined in step S124 that the instruction for peaking display has not been issued or after step S125, the microcomputer 234 performs the live view display (step S126). The microcomputer 234 then shifts the processing to step S114. In the live view display, the microcomputer 234 inputs, to the display driver 224, the image data stored in the SDRAM 212 as the result of the image processing or the composite image data stored in the SDRAM 212 as the result of the peak processing. Accordingly, the display driver 224 converts the input image data or composite image data into a video signal, and then outputs the video signal to the display unit 226. The display unit 226 displays an image based on this video signal. This live view display allows the user to, for example, check the composition using the display unit 226. Here, in the present embodiment, when the focus ring 112 is operated during the live view display, the microcomputer 108 controls the driver 106 in accordance with the operation amount of the focus ring 112 to drive the focus lens.

FIG. 3 is a flowchart showing the image processing. When the image processing is started, the basic image processing unit 2181 subjects the RAW data stored in the SDRAM 212 to the basic image processing (step S201). The special image processing unit 2182 then subjects the image data (YCbCr data) stored in the SDRAM 212 as the result of the basic image processing to the special image processing (step S202). Thus, the image processing is finished. The basic image processing and the special image processing will be described in detail below.

FIG. 4 is a flowchart showing the basic image processing. After the start of the basic image processing, the basic image processing unit 2181 performs OB subtraction processing (step S301). In the OB subtraction processing, the basic image processing unit 2181 subtracts an optical black (OB) value from the input RAW data to remove the dark current component in the RAW data.

After the OB subtraction processing, the basic image processing unit 2181 performs the WB correction processing (step S302). In the WB correction processing, the basic image processing unit 2181 multiplies the RAW data that has been subjected to the OB subtraction processing by a WB gain corresponding to a WB mode preset by the user, and thereby corrects the color balance of the image.

After the WB correction processing, the basic image processing unit 2181 performs the synchronization processing when the format of the RAW data is the Bayer arrangement (step S303). In the synchronization processing, the basic image processing unit 2181 uses the interpolation processing to synchronize the WB-corrected RAW data. In this way, the RAW data in which one pixel has one color component of RGB is converted into RGB data in which one pixel has three color components of RGB.

After the synchronization processing, the basic image processing unit 2181 performs the color reproduction processing (step S304). In the color reproduction processing, the basic image processing unit 2181 multiplies each pixel of the RGB data by the color matrix coefficient corresponding to the set WB mode, and thereby performs the color conversion of the RGB data. Further, the basic image processing unit 2181 corrects the color so that the hue and saturation of the color-converted RGB data will be proper hue and saturation, thereby adjusting the color reproduction of the image.

Figure 5:
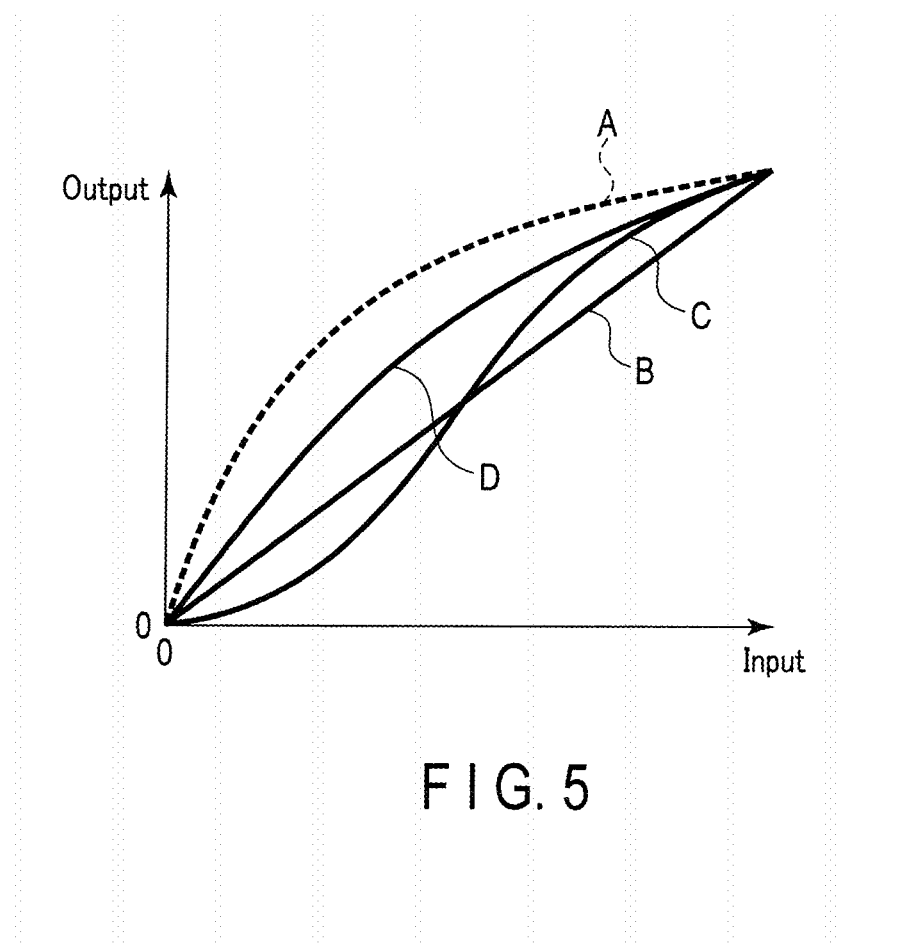
FIG. 5 is a graph showing an example of luminance change characteristic curves used in luminance changing processing.

After the color reproduction processing, the basic image processing unit 2181 performs the luminance changing processing (step S305). In the luminance changing processing, the basic image processing unit 2181 gamma-converts the RGB data that has been subjected to the color reproduction processing, and further converts the gamma-converted RGB data into YCbCr (luminance and color difference) data, and then gamma-converts the Y data. In the luminance changing processing, different gamma-conversions are performed depending on the setting of the special image processing. FIG. 5 is a graph showing an example of luminance change characteristic curves used in the luminance changing processing.

A function A in FIG. 5 is an example of a function used in the luminance changing processing of the RGB data, and is a function to change, for example, the display characteristics or contrast of the display unit 226. If the characteristics of the RGB data are changed by the use of the function A, an image can be displayed on the display unit 226 with proper contrast.

A function B is an example of a function used in normal luminance changing processing in which no particular special effect is added. The function B is used for the Y data. That is, the luminance characteristics of the RGB data are changed by the use of the function A, and the RGB data after the change of the luminance characteristics is converted into YCbCr data, and then the characteristics of the Y data are further changed by the use of the function B. When the characteristics of the Y data are changed by the function B, the characteristics of the Y data to be obtained will be the characteristics of a linear transform which is the result of the luminance changing processing using the function A.

A function C is a function of the characteristics that increase a high-luminance portion and decrease a low-luminance portion compared to the function B. The function C is also used for the Y data. That is, the luminance characteristics of the RGB data are changed by the use of the function A, and the RGB data after the change of the luminance characteristics is converted into YCbCr data, and then the characteristics of the Y data are further changed by the use of the function C. When the characteristics of the Y data are changed by the function C, the contrast of the image is emphasized. This function C is used in a special effect processing mode which adds visual effects obtained by the photography with, for example, a toy camera, or in a special effect processing mode which adds popish visual effects. The coefficient of the function C may be changed so that the function C can be used for the RGB data.

A function D is a function of the characteristics that increase the overall luminance compared to the function B. The function D is also used for the Y data. That is, the luminance characteristics of the RGB data are changed by the use of the function A, and the RGB data after the change of the luminance characteristics is converted into YCbCr data, and then the characteristics of the Y data are further changed by the use of the function D. When the characteristics of the Y data are converted by the function D, the contrast is suppressed, and a brighter image is obtained. This function D is used in a special effect processing mode which adds fantasy-style visual effects. The coefficient of the function D may be changed so that the function D can be used for the RGB data.

After the luminance changing processing, the basic image processing unit 2181 performs the edge enhancement processing (step S306). In the edge enhancement processing, the basic image processing unit 2181 subjects the Y data after the luminance changing processing to band pass filter processing to extract an edge signal, and multiplies the extracted edge signal by a coefficient corresponding to an edge enhancement amount. The basic image processing unit 2181 then adds the edge component multiplied by the coefficient to the original Y data to enhance the edge component in the image.

After the edge enhancement processing, the basic image processing unit 2181 performs the noise reduction (NR) processing (step S307). The basic image processing unit 2181 then finishes the processing in FIG. 4. In the noise reduction processing, the basic image processing unit 2181 frequency-resolves the Y data that has been subjected to the edge enhancement processing, and reduces the noise component in the image by, for example, coring processing in accordance with the frequency. The noise component may be reduced in the Cb data and the Cr data. The data after the noise reduction processing is again converted into the RGB format by a predetermined matrix operation when the recording format is the TIFF format.

Figure 6:
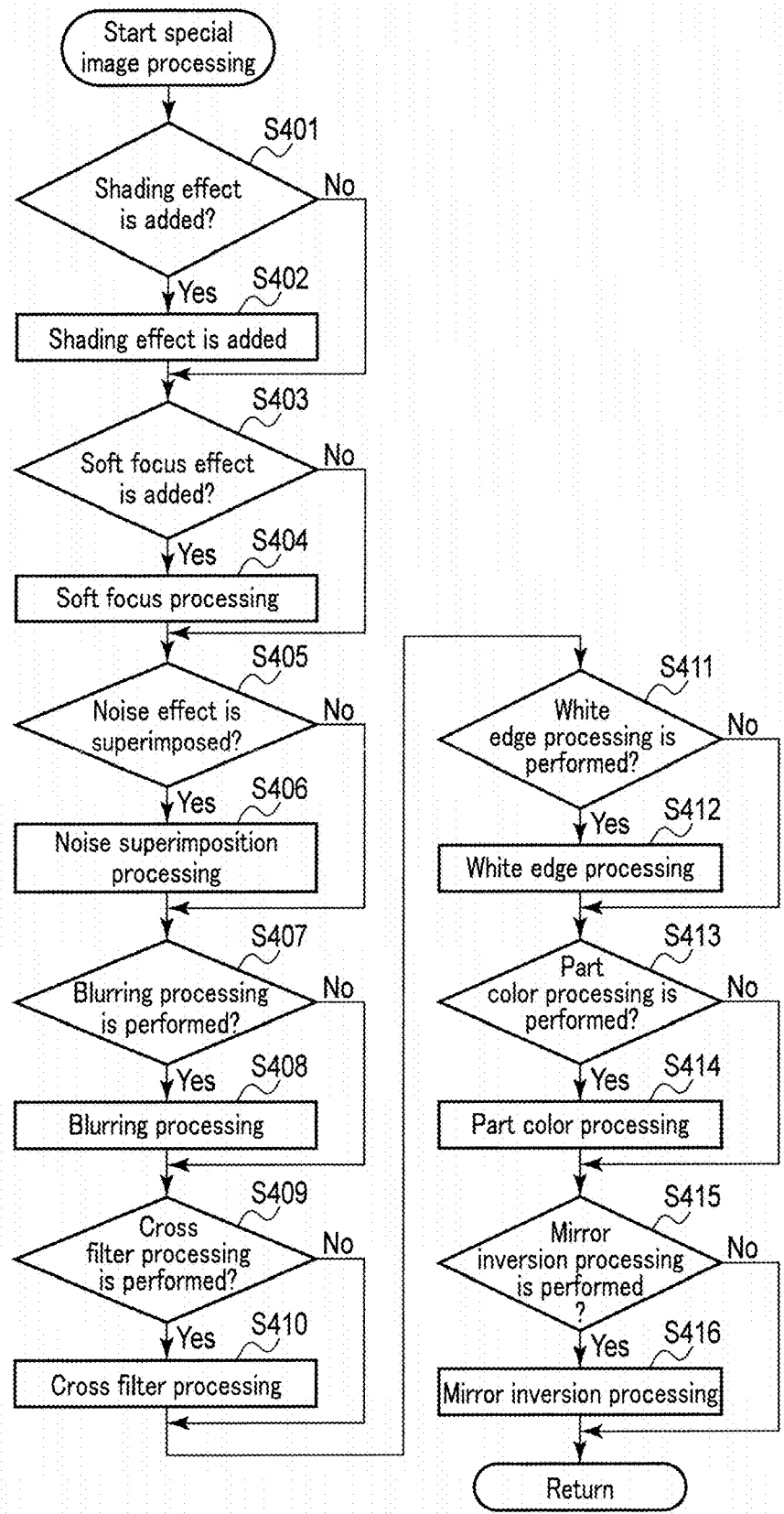
FIG. 6 is a flowchart showing special image processing.

FIG. 6 is a flowchart showing the special image processing. After the start of the special image processing, the special image processing unit 2182 determines whether to add the shading effect (step S401). When it is determined in step S401 that the shading effect is not added, the special image processing unit 2182 skips the processing in step S402.

When it is determined in step S401 that the shading effect is added, the special image processing unit 2182 adds the shading effect to the Y data (step S402). In this processing, the special image processing unit 2182 generates, for example, a gain map such that the value of a gain gradually decreases with the distance from the central position of the Y data. The special image processing unit 2182 then multiplies the Y data for each pixel by a gain corresponding to this pixel. Here, the maximum value of the gain is 1.

The special image processing unit 2182 then determines whether to add a soft focus effect (step S403). When it is determined in step S403 that the soft focus effect is not added, the special image processing unit 2182 skips the processing in step S404.

When it is determined in step S403 that the soft focus effect is added, the special image processing unit 2182 adds the soft focus effect to the YCbCr data (step S404). In this processing, the special image processing unit 2182 adds blurring to the YCbCr data by subjecting the YCbCr data to low pass filter processing. The special image processing unit 2182 then composes the YCbCr data after blurring with the YCbCr data before blurring at a predetermined ratio (e.g., YCbCr data after blurring:YCbCr data before blurring=2:3).

The special image processing unit 2182 then determines whether to superimpose a noise effect (step S405). When it is determined in step S405 that the noise effect is not superimposed, the special image processing unit 2182 skips the processing in step S406.

When it is determined in step S405 that the noise effect is superimposed, the special image processing unit 2182 superimposes the noise effect on the YCbCr data (step S406). In this processing, the special image processing unit 2182 superimposes noise data on the YCbCr data. Here, regarding the noise data, noise data having a fixed pattern previously stored in the flash memory 238 may be used, or noise data may be generated by the use of, for example, a pseudo-random number generator whenever the processing to superimpose the noise effect is performed.

The special image processing unit 2182 then determines whether to perform the blurring processing (step S407). When it is determined in step S407 that the blurring processing is not performed, the special image processing unit 2182 skips the processing in step S408.

When it is determined in step S407 that the blurring processing is performed, the special image processing unit 2182 subjects the YCbCr data to the blurring processing (step S408). In this processing, the special image processing unit 2182 sets the values of a low pass filter used for the blurring processing so that high-frequency components gradually decrease vertically and horizontally around the subject position (which may be, for example, an AF position). The special image processing unit 2182 then performs the blurring processing on the basis of the values of the low pass filter. The blurring processing may be performed to gradually blur in accordance with the distance from the center.

The special image processing unit 2182 then determines whether to perform cross filter processing (step S409). When it is determined in step S409 that the cross filter processing is not performed, the special image processing unit 2182 skips the processing in step S410.

When it is determined in step S409 that the cross filter processing is performed, the special image processing unit 2182 subjects the Y data to the cross filter processing (step S410). In this processing, the special image processing unit 2182 searches for a bright spot (high-luminance pixel) in the image data (Y data). The special image processing unit 2182 then draws a bright line around the bright spot in the Y data that has been searched for.

The special image processing unit 2182 then determines whether to perform white edge processing (step S411). When it is determined in step S411 that the white edge processing is not performed, the special image processing unit 2182 skips the processing in step S412.

When it is determined in step S411 that the white edge processing is performed, the special image processing unit 2182 subjects the YCbCr data to the white edge processing (step S412). In this processing, the special image processing unit 2182 converts the YCbCr data for each pixel, for example, in conformity to conversion characteristics such that the ratio of white (e.g., Y=255, Cb=Cr=0 (achromatic color)) gradually increases in accordance with the distance from the central position of the YCbCr data.

The special image processing unit 2182 then determines whether to perform part color processing (step S413). When it is determined in step S413 that the part color processing is not performed, the special image processing unit 2182 skips the processing in step S414.

When it is determined in step S413 that the part color processing is performed, the special image processing unit 2182 subjects the YCbCr data to the part color processing (step S414). In this processing, the special image processing unit 2182 creates a gain map of colors so that predetermined colors will remain and so that other colors will be achromatic colors. After generating the gain map, the special image processing unit 2182 multiplies each pixel in the Cb data and the Cr data (the achromatic colors are generated to be 0) by a gain.

The special image processing unit 2182 then determines whether to perform mirror inversion processing (step S415). When it is determined in step S415 that the mirror inversion processing is not performed, the special image processing unit 2182 skips the processing in step S416 to finish the processing in FIG. 6.

When it is determined in step S415 that the mirror inversion processing is performed, the special image processing unit 2182 subjects the YCbCr data to the mirror inversion processing (step S416). In this processing, the special image processing unit 2182 vertically inverts the upper half of the YCbCr data and composes the vertically inverted upper half with the lower half. The special image processing unit 2182 then finishes the processing in FIG. 6. Here, in the mirror inversion processing, the left half of the YCbCr data may be horizontally inverted and composed with the right half.

FIG. 7 is a flowchart showing the peak processing according to the first embodiment. In FIG. 7, the peak extraction unit 2201 of the peak image processing unit 220 extracts a peak signal from the RAW data (step S501). Specifically, the peak extraction unit 2201 subjects the RAW data to the band pass filter processing to extract a signal of contrast. Here, the band of the signal extracted by the band pass filter is preferably changed in accordance with various conditions such as a subject distance and the F-value.

Figure 8A:
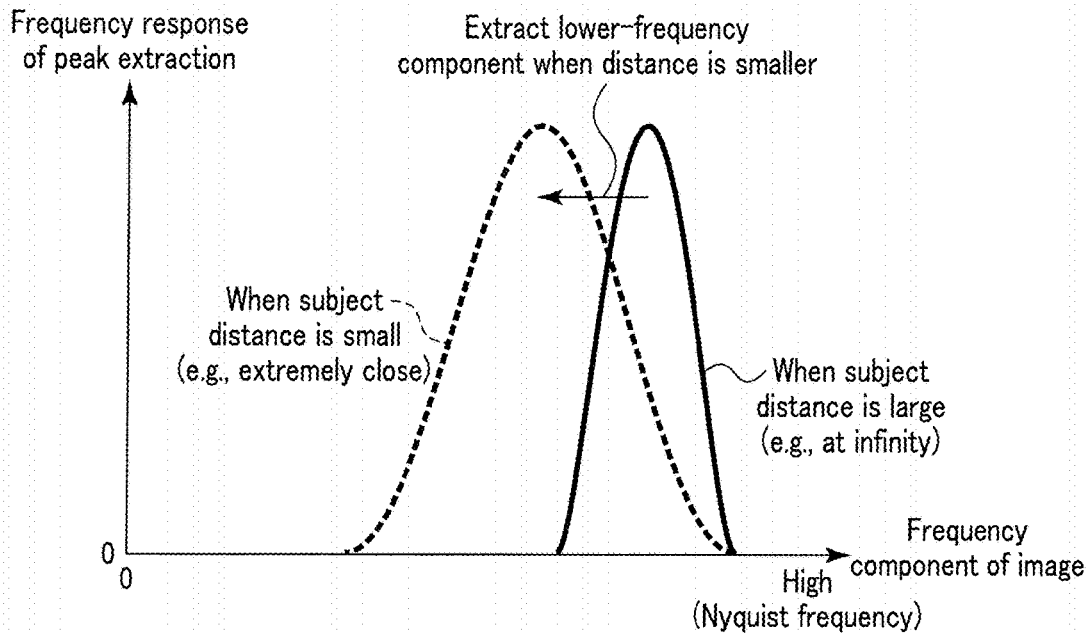
FIG. 8A is a graph showing the relation between a subject distance and the frequency band of peak extraction.
Figure 8B:
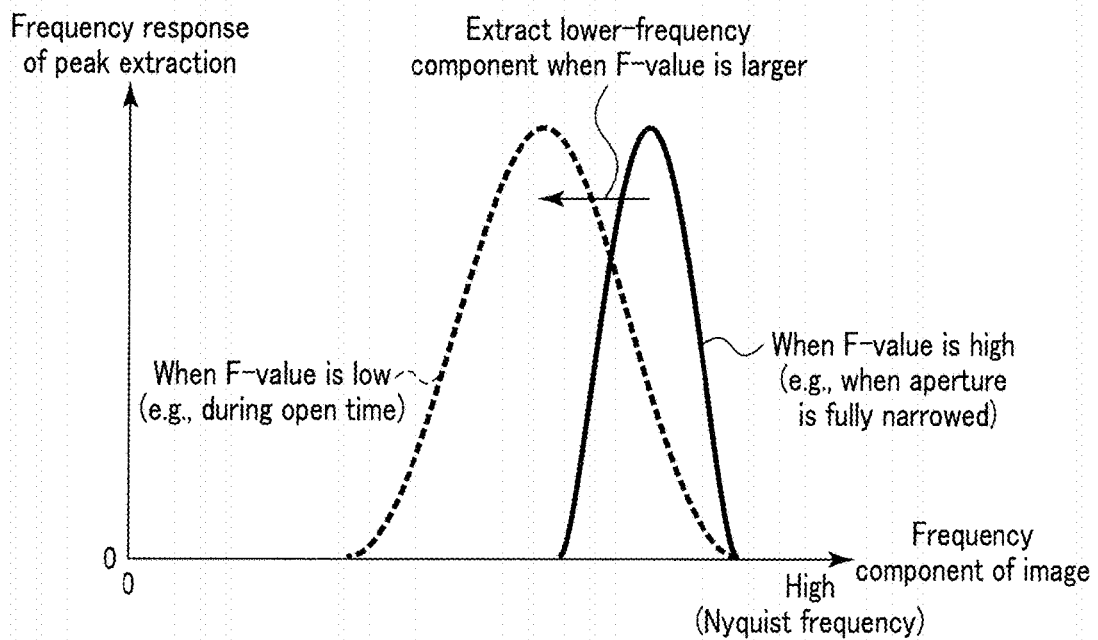
FIG. 8B is a graph showing the relation between an F-value and the frequency band of peak extraction.

FIG. 8A is a graph showing the relation between the subject distance and the frequency band of peak extraction. FIG. 8B is a graph showing the relation between the F-value and the frequency band of peak extraction. Here, in both FIG. 8A and FIG. 8B, the horizontal axis indicates the value of the frequency of the image (RAW data), and the vertical axis indicates the frequency response (pixel value) of the extracted peak signal.

When the subject distance is large, small subjects come into focus, so that a peak signal is easily extracted. In this case, a large number of peak lines are displayed if peaking display is simply performed. Therefore, it is difficult for the user to recognize the focus state of a desired subject. Thus, for peaking display with a large subject distance, the frequency band of peak extraction is set to the high-frequency side as indicated by a solid line in FIG. 8A. As a result, the number of peak lines to be extracted is restricted. In contrast, when the subject distance is small, small subjects are difficult to come into focus, so that the number of peak lines to be extracted decreases. Therefore, for peaking display with a small subject distance, the frequency band of peak extraction is set to the lower-frequency side compared to the case of the large subject distance, as indicated by a broken line in FIG. 8A. Thus, the frequency band of peak extraction is changed to the lower-frequency side when the subject distance is smaller, which enables the peak lines in the case of the peaking display to appear constant regardless of the subject distance.

The subject distance can be acquired by acquiring the state (position) of the lens 102 by communication via the I/F 114. An exclusive sensor may be provided to obtain a subject distance.

When the F-value is larger (the diaphragm 104 is narrowed down), the depth of field is greater, and it is easier to focus. In this case as well as in the case of the large subject distance, a large number of peak lines are displayed if peaking display is simply performed. Therefore, for peaking display with a high F-value, the frequency band of the peak signal to be extracted is set to the high-frequency side, as indicated by a solid line in FIG. 8B. In contrast, for peaking display with a small F-value (the diaphragm 104 is opened), the frequency band of peak extraction is set to the lower-frequency side compared to the case of the large F-value, as indicated by a broken line in FIG. 8B. Thus, the frequency band of peak extraction is changed to the lower-frequency side when the F-value is smaller, when enables the peak lines in the case of the peaking display to appear constant regardless of the subject distance.

The F-value can be acquired by acquiring the state of the diaphragm 104 by communication via the I/F 114.

FIG. 8A shows an example of how the frequency band of peak extraction is changed in accordance with the subject distance. FIG. 8B shows an example of how the frequency band of peak extraction is changed in accordance with the F-value. Alternatively, the frequency band of peak extraction may be changed in accordance with the focal distance (zoom position). In this case, the frequency band of peak extraction is changed to the lower-frequency side when the focal distance is larger, which enables the peak lines in the case of the peaking display to appear constant.

After the peak extraction, the peak correction unit 2202 performs coring processing for the peak image data obtained by extracting the peak signal (step S502). Specifically, the peak correction unit 2202 clips a small-amplitude component (having a pixel value in a given range) in the peak image data to a predetermined value (e.g., 0).

After the coring processing, the peak correction unit 2202 multiplies the peak signal that has been subjected to the coring processing by a gain to amplify the peak image data (step S503). Here, the gain is, for example, a fixed gain previously stored in the flash memory 238.

After the multiplication by the gain, the peak correction unit 2202 clips the component of a part of the peak image data so that the peaking display will be performed without discomfort (step S504). The peak signal extracted in the band pass filter processing includes a positive component and a negative component. The positive component corresponds to a high-luminance component, and the negative component corresponds to a low-luminance component. Therefore, when a bright peak line (e.g., white) is displayed, the negative component of the peak image data is clipped to 0. On the other hand, when a dark peak line (e.g., black) is displayed, the positive component of the peak image data is clipped to 0. Whether to display the bright peak line is decided depending on, for example, the brightness of the subject. That is, it is decided that the bright peak line is displayed when the subject is dark, whereas it is decided that the dark peak line is displayed when the subject is bright.

The positive component or the negative component may be clipped in the later-described luminance changing processing in step S506 instead of being clipped in step S504. Whether to display the bright peak line or the dark peak line can also be set in the camera setting in step S105.

After the signal clip, the peak correction unit 2202 subjects the peak image data to the low pass filter processing (step S505). FIG. 9 is a table showing an example of the filter factors of the low pass filter used in the low pass filter processing for the peak image data. The actual output after the low pass filter processing is obtained by adding up multiplications of the respective pixels of the peak image data for 5×5 pixels around a pixel of interest by coefficients in FIG. 9 and dividing the addition by the sum of the coefficients in FIG. 9. When the peak image data is processed by the use of a filter having the characteristics shown in FIG. 9, a spread is provided by averaging the peak portion. Here, the values of the filter factors shown in FIG. 9 are illustrative only and may be suitably changed. Moreover, it is not always necessary to use the 5×5 filter.

After the low pass filter processing for the peak image data, the peak correction unit 2202 subjects the peak image data to the luminance changing processing (step S506). FIG. 10 is a graph showing an example of luminance change characteristic curves used in the luminance changing processing for the peak image data. As shown in FIG. 10, when the bright peak line is displayed, the luminance changing processing is performed by the use of the luminance change characteristic curve (solid line in FIG. 10) having characteristics to emphasize the contrast of the positive component of the peak image data. On the other hand, when the dark peak line is displayed, the luminance changing processing is performed by the use of the luminance change characteristic curve (broken line in FIG. 10) having characteristics to emphasize the contrast of the negative component of the peak image data. Thus, according to the present embodiment, the peak image data blurred by the low pass filter processing is subjected to the luminance changing processing for emphasizing contrast. When this processing is performed, a thick and clear peak line can be displayed during the peaking display. Thus, it is easy for the user to recognize the focus state of a desired subject. Here, in the example shown in FIG. 10, the peak image data is converted by the luminance changing processing into image data in which each pixel has a gain value equal to or more than 0 and less than or equal to 1.0. The upper limit value and the lower limit value of the luminance change characteristic curve are not limited to the example shown in FIG. 10.

The peak correction unit 2202 then determines whether AF is performed (step S507). When it is determined in step S507 that AF is not performed, the peak correction unit 2202 skips the processing in step S508. When it is determined in step S507 that AF is performed, the peak correction unit 2202 multiplies the pixels other than the pixels around the focus position (the position where the peak of an AF evaluation value is detected) in the peak image data by 0 (step S508). As a result of this processing, it is possible to mask so that a peak portion corresponding to the focus position is extracted from the peak portions extracted by the peak extraction processing.

By the processing up to step S508, the processing for the peak image data is finished. The background image correction unit 2221 of the composing unit 222 then subjects the background image data to the low pass filter processing (step S509). Here, the background image data is image data that has been subjected to at least the basic image processing. The special image processing may be or may not be performed. FIG. 11 is a table showing an example of the filter factors of the low pass filter used in the low pass filter processing for the background image data. The background image data is blurred compared to the peak image data by processing the background image data using a filter having the characteristics shown in FIG. 11. Here, the values of the filter factors shown in FIG. 9 are illustrative only and may be suitably changed. Moreover, it is not always necessary to use the 5×5 filter. However, it is preferable to set the factors of the filter so that the degree of blurring is higher in the low pass filter processing for the background image data than in the low pass filter processing for the peak image data.

Figure 12:
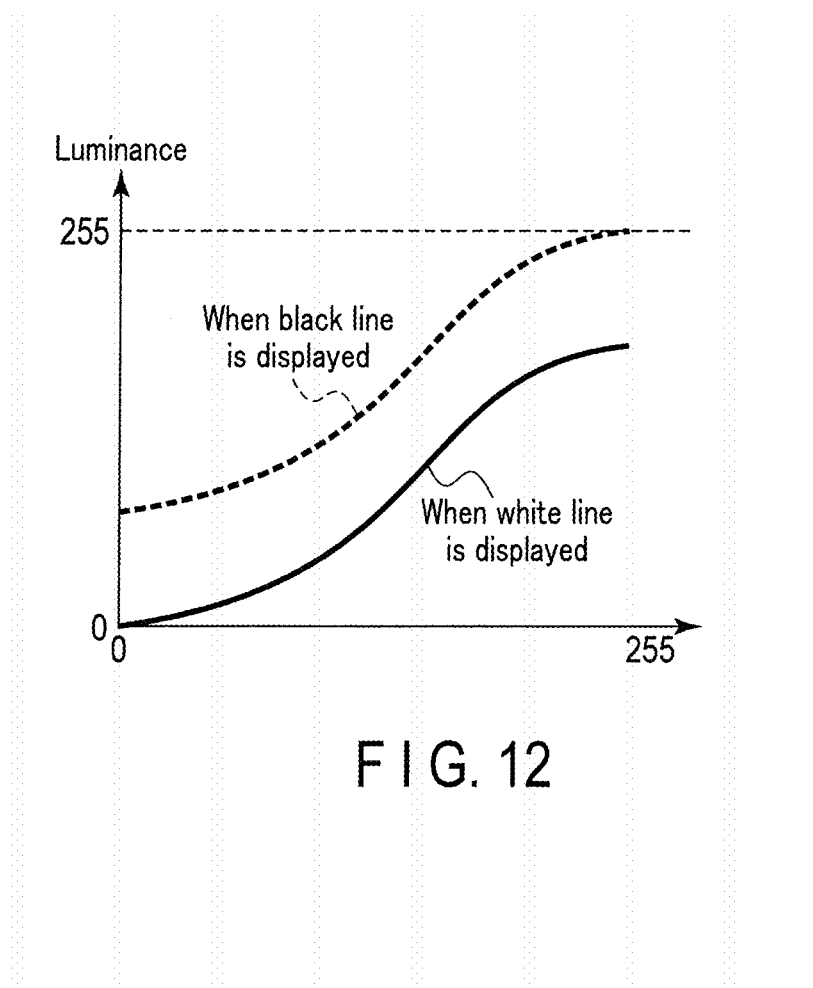
FIG. 12 is a diagram showing an example of luminance change characteristic curves used in luminance changing processing for the background image data.

After the low pass filter processing for the background image data, the background image correction unit 2221 subjects the background image data to the luminance changing processing (step S510). FIG. 12 is a diagram showing an example of luminance change characteristic curves used in the luminance changing processing for the background image data. In the luminance changing processing in step S510, the luminance characteristics of the background image data are changed so that the brightness-darkness difference between the background image data and the peak image data is emphasized. That is, as shown in FIG. 12, when a bright peak line is displayed, the background image data is entirely darkened by subjecting the background image data to luminance characteristic changing processing using a luminance change characteristic curve having its output luminance suppressed. On the other hand, when a dark peak line is displayed, the background image data is entirely brightened by subjecting the background image data to luminance characteristic changing processing using a luminance change characteristic curve having its output luminance increased. The luminance change characteristic curves shown in FIG. 12 are illustrative only. For example, the background image data may be uniformly brightened or darkened without input data.

After the luminance characteristic changing processing for the peak image data and the luminance characteristic changing processing for the background image data, the image composing unit 2222 of the composing unit 222 composes the peak image data with the background image data to generate composite image data (step S511). For example, the image composing unit 2222 composes the peak image data with the background image data by weighting addition. In this instance, the data are composed so that the peak line more clearly appears when the gain value of the peak image data is closer to 1.0. By way of example, the data are composed in accordance with (Expression 1) below when the white peak line is displayed, whereas the data are composed in accordance with (Expression 2) below when the black peak line is displayed. The calculations shown in (Expression 1) and (Expression 2) are performed for each component of the image data. For example, when the background image data is the YCbCr data, the calculations in (Expression 1) and (Expression 2) are performed for each of the Y data, the Cb data, and the Cr data. The values of white in (Expression 1) are pixel values which appear white when displayed. For example, the values of white in the case of the YCbCr data are Y=255 and Cb=Cr=0. The values of white in the case of the RGB data are R=G=B=255. The values of black in (Expression 2) are pixel values which appear black when displayed. For example, the values of black in the case of the YCbCr data are Y=0 and Cb=Cr=0.

The values of black in the case of the RGB data are R=G=B=0.

Pixel value of background image data×(1.0−gain value of peak image data)+pixel value of white×gain value of peak image data (Expression 1)

Pixel value of background image data×(1.0−gain value of peak image data)+pixel value of black×gain value of peak image data (Expression 2)

When the calculations shown in (Expression 1) and (Expression 2) are performed, composite image data in which a thick and clear peak line is composed in the peak portion of the background image data blurred by the low pass filter processing is generated.

As described above, according to the present embodiment, the peak processing is performed by the use of the peak signal extracted from the RAW data. That is, according to the present embodiment, the peak image data and the background image data are subjected to the independent image processing, respectively. There is a possibility that the background image data may have been subjected to the luminance changing processing and various special effect processing using the function C and the function D in FIG. 5. If such special processing has been performed, it will be difficult to extract the peak portion. In contrast, the RAW data is image data before being subjected to the above processing. The peak image data is generated from such RAW data, so that according to the present embodiment, it is possible to achieve stable peaking display which depends on neither the contents of the image processing performed for the background image data nor image processing parameters used during image processing.

In the present embodiment, the peak image data is subjected to the luminance changing processing for emphasizing contrast after the low pass filter processing. In contrast, the background image data is subjected to the low pass filter processing so that the edge portion is not easily confused with the peak image in the background image data, and the background image data is subjected to the luminance changing processing to emphasize the brightness-darkness difference between the background image data and the peak image data. As a result, the peak line can be clearly displayed compared to the background image during the peaking display. Therefore, it is easy for the user to recognize the focus state of the peak line.

Here, in the present embodiment, the peak image data is blurred by subjecting the peak image data to the low pass filter processing. The noise reduction processing may be used instead of the low pass filter processing to blur the peak image data.

Second Embodiment

Next, the second embodiment of the present invention is described. The second embodiment is different from the first embodiment in that the color tone of the background image data is further changed to more emphasize the peak line. The second embodiment is particularly preferable when the peak line is colored.

Figure 13:
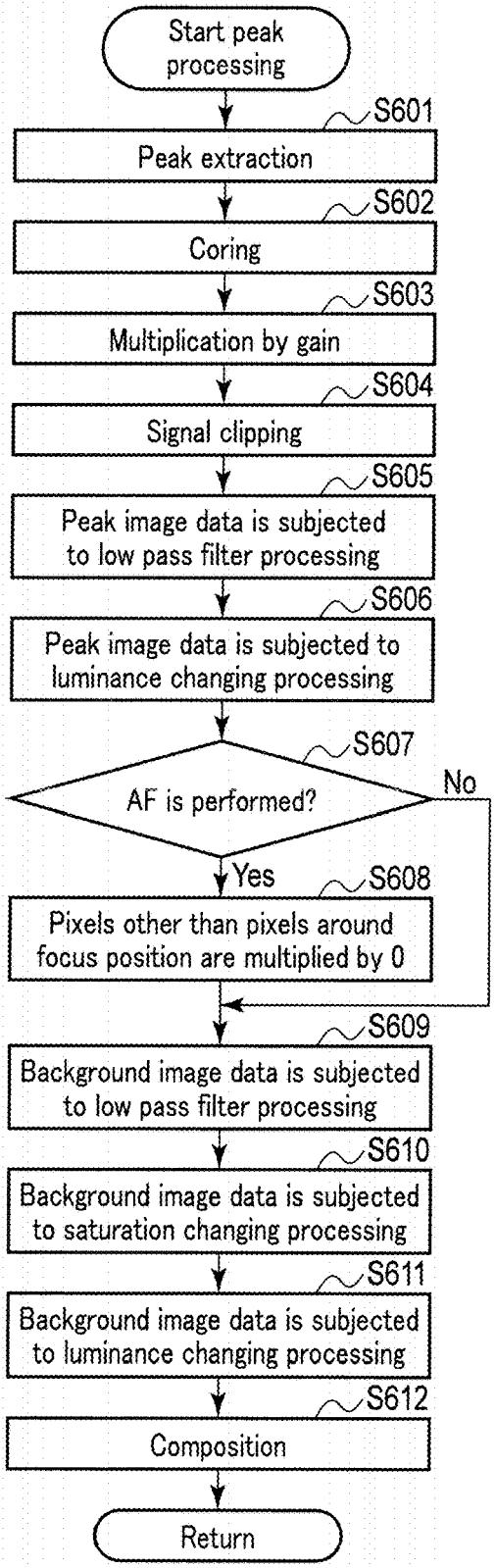
FIG. 13 is a flowchart showing peak processing according to the second embodiment.

FIG. 13 is a flowchart showing peak processing according to the second embodiment. Here, the basic flow of processing in FIG. 13 is similar to that in FIG. 7. Therefore, FIG. 13 is not described in detail. Specifically, steps S601 to S609 in FIG. 13 are similar to steps S501 to S509 in FIG. 7 and are therefore not described in detail.

After the low pass filter processing for the background image data, the background image correction unit 2221 subjects the background image data to the saturation changing processing (step S610). The saturation changing processing is processing for changing the saturation of the background image data so that the color of the peak line is emphasized. For example, when a peak line of a high-saturation color is composed, the saturation of the background image data is reduced. Means for reducing the saturation is, for example, means for multiplying color difference data (the Cb data and the Cr data) by the same coefficient of 0.5. This coefficient may be suitably changed between 0 or more and less than 1.

After the saturation changing processing, the background image correction unit 2221 subjects the background image data to the luminance changing processing (step S611). The luminance changing processing may be similar to that in step S510 in FIG. 13.

After the luminance changing processing, the background image correction unit 2221 composes the peak image data with the background image data to generate composite image data (step S612). The composing processing is basically similar to that in step S511 in FIG. 13. However, for the composition, the "pixel value of white" in (Expression 1) is replaced by the pixel value of the color of the peak line to be composed with. For example, when the color of the peak line is red, R=255 and G=B=0 instead of R=G=B=255 which is the "pixel value of white" in (Expression 1).

As described above, according to the present embodiment, the saturation of the background image data is changed so that the color of the peak image data is emphasized. Thus, even if the peak line is colored, the user does not confuse the color of the peak line with the color of the background. Therefore, it is easy for the user to recognize the focus state of the peak line.

Third Embodiment

Next, the third embodiment of the present invention is described. The third embodiment is different from the first and second embodiments in that the peak portion is changed in accordance with the special effect added to the background image data.

FIG. 14 is a flowchart showing peak processing according to the third embodiment. Here, the basic flow of processing in FIG. 14 is similar to that in FIG. 7. Therefore, FIG. 14 is not described in detail. Specifically, steps S711 to S716 and S719 to S721 in FIG. 14 are similar to steps S501 to S506 and S509 to S511 in FIG. 7 and are therefore not described in detail.

After the luminance changing processing for the peak image data, the peak correction unit 2202 determines whether the special effect is added to the background image data (step S717). When it is determined in step S717 that the special effect is not added to the background image data, the peak correction unit 2202 skips the processing in step S718. When it is determined in step S717 that the special effect is added to the background image data, the peak correction unit 2202 performs the changing processing of the peak image data corresponding to the special effect (step S718). In this processing, the peak image data is changed so that the peak image data is composed at the position where the influence of the image change by the special effect is small.

For example, the background image data to which the shading effect is added as the special effect is image data in which the center is bright and the peripheral part is dark, as shown in FIG. 15A. The focus state is unclear in the part which has darkened due to the addition of the shading effect. Therefore, as shown in FIG. 15B, the peak image data is changed so that the peak image data is composed at the position to which the shading effect is not added. Here, in FIG. 15B, the peak portion to which the shading effect is not added is indicated by P, and the peak portion to which the shading effect is added is indicated by P'. If the peak line is composed in the peak portion P as shown in FIG. 15B, it is easy for the user to recognize the focus state. Here, it is not always necessary to compose the peak image data in the portion P' to which the shading effect is added. When the peak image data is composed in the portion P' to which the shading effect is added, it is preferable to compose the peak image data after changing its color so that this peak image data is distinguishable from the peak image data that is composed in the portion to which the shading effect is not added.

Figure 16A:
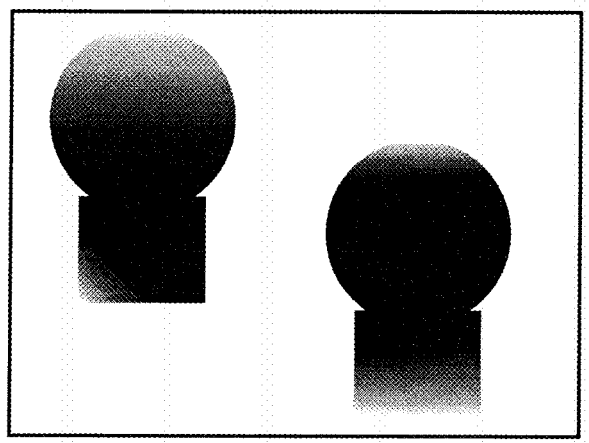
FIG. 16A is a first diagram illustrating peak changing processing in the case where blur is added to the background image data.
Figure 16B:
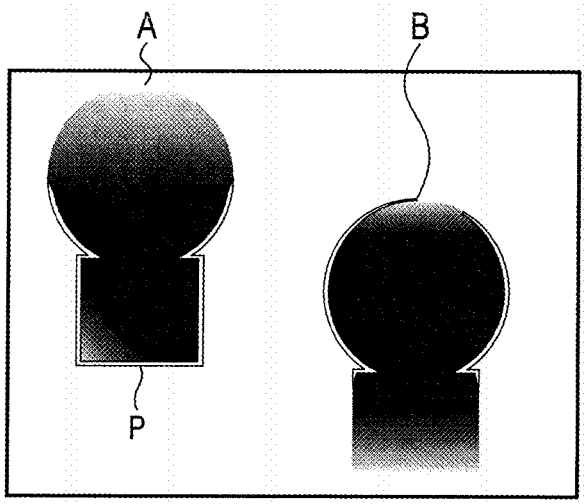
FIG. 16B is a second diagram illustrating the peak changing processing in the case where the blur is added to the background image data.

It does not make much sense if the peak line is displayed in the blurred portion of the background image data to which blur is added as the special effect as shown in FIG. 16A. Therefore, as shown in FIG. 16B, the peak image data is changed so that the peak image data is composed in the portion P to which the blur is not added. It is not always necessary to compose the peak image data in the portion to which the blur is added. When the peak image data is composed in the portion to which the blur is added, it is preferable to compose the peak image data after changing its color so that this peak image data is distinguishable from the peak image data that is composed in the portion to which the blur is not added.

The background image data to which the white edge processing is added as the special effect is image data in which the center is dark and the peripheral part is bright, as shown in FIG. 17A. When the background image data has been subjected to the white edge processing, the peak image data is changed so that the peak line is composed in the portion P to which the white edge processing that is weak in the center is not added, as shown in FIG. 17B. It is not always necessary to compose the peak image data in the portion P' to which the strong white edge processing is added. When the peak image data is composed in the portion P' to which the strong white edge processing is added, it is preferable to compose the peak image data after changing its color so that this peak image data is distinguishable from the peak image data that is composed in the portion P to which weak white edge processing is not added.

Figure 18A:
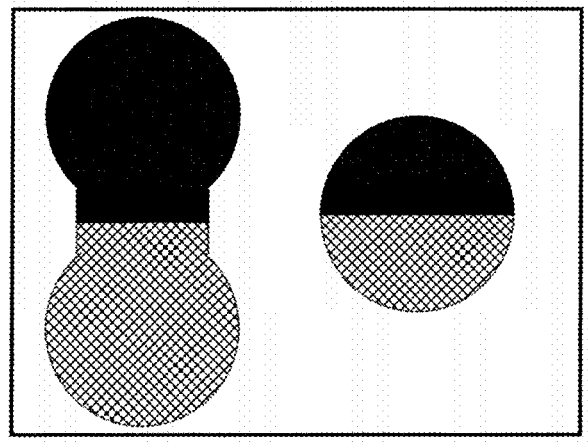
FIG. 18A is a first diagram illustrating peak changing processing in the case where the background image data is subjected to mirror inversion processing.
Figure 18B:
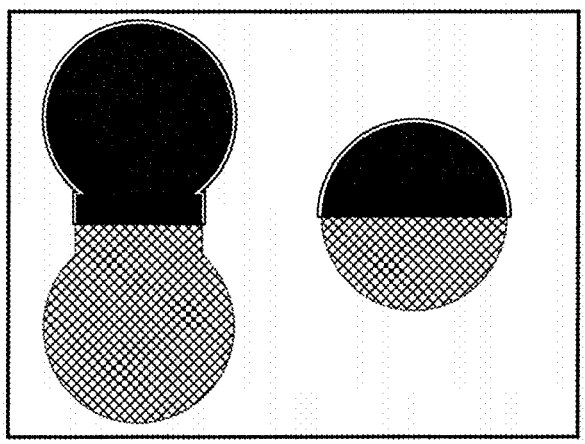
FIG. 18B is a second diagram illustrating the peak changing processing in the case where the background image data is subjected to mirror inversion processing.

The background image data which has been subjected to the mirror inversion processing as the special effect is vertically symmetrical (horizontally symmetrical) image data as shown in FIG. 18A. An actual subject is the upper half (or left half) part. Therefore, as shown in FIG. 18B, the peak image data is composed in the upper half alone.

The above peak changing processing shown in FIG. 15A to FIG. 18B is illustrative only. If the peak line can be displayed so that the peak line is not affected by the special effect, the contents of the peak changing processing can be suitably changed.

As described above, according to the present embodiment, the changing processing of the peak image data is performed depending on the contents of the special effect. As a result, the part which has become invisible due to the special effect or the part which does not need focus adjustment becomes clear, and the user does not need to perform unnecessary focus adjustment.

While the present invention has been described above in connection with the embodiments, it should be understood that the present invention is not limited to the embodiments described above and various modifications and applications can be made within the scope of the spirit of the present invention. Although "first", "then", and others are used for convenience to describe the operation in each of the flowcharts described above, this does not mean that the operation needs to be performed in this order.

Each of the methods of the processing by the imaging apparatus according to the embodiments described above, that is, the processing shown in each of the flowcharts can also be stored as a program that can be executed by the microcomputer 234. This can also be stored and distributed in a storage medium of an external storage device such as a memory card (e.g., a ROM card, a RAM card), a magnetic disk (e.g., a floppy disk, a hard disk), an optical disk (e.g., a CD-ROM, a DVD), or a semiconductor memory. The microcomputer 234 then reads the program stored in the storage medium of the external storage device, and can perform the processing described above when the operation is controlled by the read program.

Furthermore, the embodiments described above include various stages of inventions, and various inventions can be extracted by properly combining the disclosed constituent requirements. For example, when the problems described above can be solved and advantageous effects described above can be obtained even if some of all the constituent requirements shown in the embodiments are eliminated, a configuration in which those constituent requirements are eliminated can also be extracted as an invention.

What is claimed is:
1. An imaging apparatus comprising:
an imaging unit which images a subject to acquire RAW data;
a peak image generating unit which extracts peak portions of a contrast of the subject from the RAW data to generate peak image data;
a background image generating unit which subjects the RAW data to image processing to add a special effect thereto, and generates background image data;
a composing unit which composes the peak image data with the background image data to generate composite image data; and
a display unit which displays an image based on the composite image data,
wherein the composing unit changes the peak image data so that the peak image data is not composed with a region of the background image data in which an image change is added by the added special effect, the background image data corresponding to a position of the peak image data.

2. The imaging apparatus of claim 1, wherein the composing unit changes the peak image data so that the peak image data is composed with only a region of the background image data in which the image change is not added by the added special effect, the background image data corresponding to a position of the peak image data.

3. A control method of an imaging apparatus, the imaging apparatus comprising an imaging unit which images a subject to acquire RAW data, and a display unit which displays an image based on image data generated on the basis of the RAW data, the control method comprising:
extracting peak portions of a contrast of the subject from the RAW data to generate peak image data;
subjecting the RAW data to image processing to generate background image data;
composing the peak image data with the background image data to generate composite image data;
displaying an image based on the composite image data; and performing processing to add a special effect to the background image data,
wherein the composing changes the peak image data so that the peak image data is not composed with a region of the background image data in which an image change is added by the added special effect, the background image data corresponding to a position of the peak image data.

4. The control method of the imaging apparatus according to claim 3, further comprising:
correcting the background image data so that the peak image data to be composed is emphasized compared to the background image data to be composed, and
composing the corrected background image data with the peak image data.

5. The control method of the imaging apparatus according to claim 3, wherein when the peak image data is generated, a peak portion is further extracted from the extracted peak portions in accordance with the focus position during imaging.

6. The control method of claim 3, wherein the composing changes the peak image data so that the peak image data is composed with only a region of the background image data in which the image change is not added by the added special effect, the background image data corresponding to a position of the peak image data.

7. The control method of claim 3, further comprising:
determining, for each of a plurality of regions of the background image data, whether or not the special effect was added to the region of the background image data,
wherein the composing includes, for each of the plurality of regions of the background image,
responsive to a determination that the special effect was added to the region of the background image data, not composing the peak image data with the region of the background image data, and
otherwise, responsive to a determination that the special effect was not added to the region of the background image data, composing the peak image data with the region of the background image data.

8. A control method of an imaging apparatus, the imaging apparatus comprising an imaging unit which images a subject to acquire RAW data, and a display unit which displays an image based on image data generated on the basis of the RAW data, the control method comprising:
extracting peak portions from the RAW data to generate peak image data;
subjecting the RAW data to image processing to generate background image data;
composing the peak image data with the background image data to generate composite image data;
displaying an image based on the composite image data; and
performing processing to add a special effect to the background image data, wherein when the peak image data is generated, a signal of a lower frequency band in the RAW data is extracted as the peak portion when a diaphragm is more open.

* * * * *